US009478082B2

(12) United States Patent
Lee

(10) Patent No.: US 9,478,082 B2
(45) Date of Patent: Oct. 25, 2016

(54) WEARABLE DEVICE AND ASSOCIATED CONTROL METHOD

(71) Applicant: Egis Technology Inc., Taipei (TW)

(72) Inventor: Jung-Chien Lee, Taipei (TW)

(73) Assignee: Egis Technology Inc., Taipei (TW)

( * ) Notice: Subject to any disclaimer, the term of this patent is extended or adjusted under 35 U.S.C. 154(b) by 56 days.

(21) Appl. No.: 14/615,378

(22) Filed: Feb. 5, 2015

(65) Prior Publication Data

US 2016/0078697 A1 Mar. 17, 2016

(30) Foreign Application Priority Data

Sep. 12, 2014 (CN) .......................... 2014 1 0465224

(51) Int. Cl.
*G05B 19/00* (2006.01)
*G07C 9/00* (2006.01)

(52) U.S. Cl.
CPC . *G07C 9/00087* (2013.01); *G07C 2009/00095* (2013.01)

(58) Field of Classification Search
CPC ................. G07C 9/00087; G07C 2009/00095
USPC ......................................................... 340/5.53
See application file for complete search history.

(56) References Cited

U.S. PATENT DOCUMENTS 8,902,045 B1 * 12/2014 Linn ....................... G06F 21/32 340/5.53
2009/0133117 A1 * 5/2009 Bentley ............... H04L 63/0846 726/17
2013/0146659 A1 6/2013 Zhou et al.
2014/0089672 A1 3/2014 Luna et al.
2015/0067824 A1 * 3/2015 Chatterton ............ G06F 3/0486 726/19
2015/0163221 A1 * 6/2015 Bolin ................. G07C 9/00309 726/7
2015/0186705 A1 * 7/2015 Magi .................... G06K 9/0002 382/125
2015/0264567 A1 * 9/2015 Sensharma ........... H04W 12/06 455/411
2015/0362977 A1 * 12/2015 Doniwa ................ G06F 1/3231 713/324

FOREIGN PATENT DOCUMENTS

WO WO 2013096954 6/2013

* cited by examiner

*Primary Examiner* — Juan A Torres

(57) ABSTRACT

A wearable device is provided. The wearable device includes: a fingerprint recognition apparatus; a pulse sensor for detecting pulse information of a user; and a processor for determining whether the user is wearing the wearable device according to the pulse information detected by the pulse sensor. When the processor determines that the user is wearing the wearable device, the processor performs a first time of fingerprint recognition and a pulse recognition on the user according to a fingerprint image detected by the fingerprint recognition apparatus and the pulse information detected by the pulse sensor, respectively. When the processor determines that the first time of fingerprint recognition and the pulse recognition are approved, the processor controls the wearable device to enter a first working state from a locked state.

10 Claims, 2 Drawing Sheets

WEARABLE DEVICE AND ASSOCIATED CONTROL METHOD

CROSS REFERENCE TO RELATED APPLICATIONS

This Application claims priority of China Patent Application No. 201410465224.X, filed on Sep. 12, 2014, the entirety of which is incorporated by reference herein.

BACKGROUND OF THE INVENTION

1. Field of the Invention

The present invention relates to fingerprint recognition, and, in particular, to a wearable device capable of integrating fingerprint recognition and pulse recognition.

2. Description of the Related Art

With advances in technology, wearable devices have become more and more popular. However, a certain level of security is required when a user performs some specific operations on a wearable device. A conventional wearable device is usually equipped with a single function to recognize the user's identity. Furthermore, another unauthorized user can freely operate the conventional wearable device after the conventional wearable device is unlocked. This may result in misuse of the conventional wearable device. Therefore, a wearable device having a higher level of security protection is needed to overcome the misuse issues of the conventional wearable devices.

BRIEF SUMMARY OF THE INVENTION

A detailed description is given in the following embodiments with reference to the accompanying drawings.

In an exemplary embodiment, a wearable device is provided. The wearable device includes: a fingerprint recognition apparatus; a pulse sensor for detecting pulse information of a user; and a processor for determining whether the user is wearing the wearable device according to the pulse information detected by the pulse sensor. When the processor determines that the user is wearing the wearable device, the processor performs a first time of first fingerprint recognition and a pulse recognition to the user according to a fingerprint image detected by the fingerprint recognition apparatus and the pulse information detected by the pulse sensor, respectively. When the processor determines that the first time of fingerprint recognition and the pulse recognition are approved, the processor controls the wearable device to enter a first working state from a locked state.

In another exemplary embodiment, a control method for a wearable device is provided. The wearable device comprises a fingerprint recognition apparatus and a pulse sensor. The method comprises the steps of: determining whether the user is wearing the wearable device according to the pulse information detected by the pulse sensor; when it is determined that the user is wearing the wearable device, performing a first time of fingerprint recognition and a pulse recognition to the user according to a fingerprint image detected by the fingerprint recognition apparatus and the pulse information detected by the pulse sensor, respectively; and when it is determined that the first time of fingerprint recognition and the pulse recognition are approved, controlling the wearable device to enter a first working state from a locked state.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
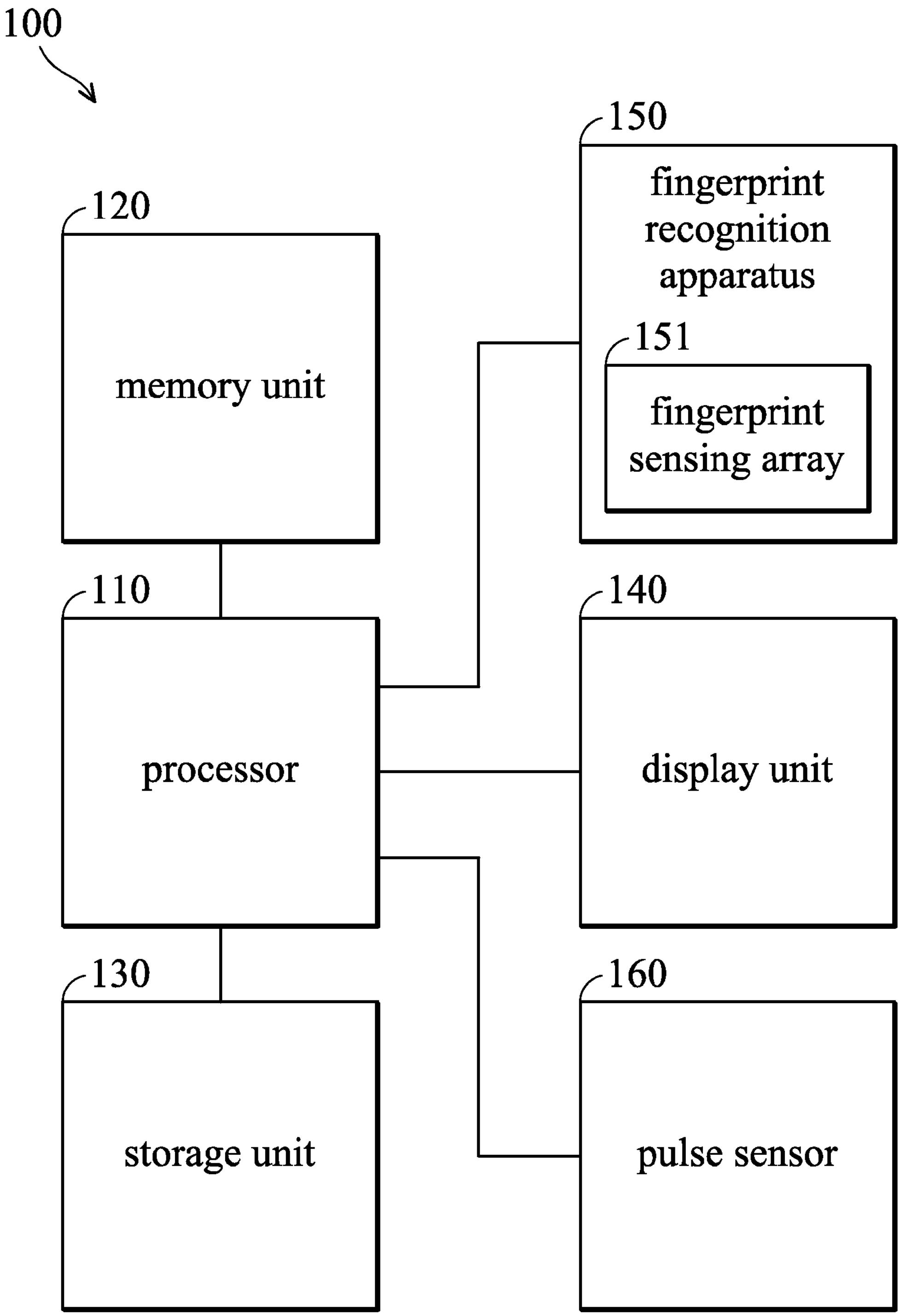
FIG. 1 is a block diagram of a wearable device in accordance with an embodiment of the invention.

FIG. 1 is a block diagram of a wearable device in accordance with an embodiment of the invention. As shown in FIG. 1, the wearable device 100 comprises a processor 110, a memory unit 120, a storage unit 130, a display unit 140, a fingerprint recognition apparatus 150, and a pulse sensor 160. In an embodiment, the electronic device 100 may be a smartphone or a tablet PC. The storage unit 130 may be a non-volatile memory, such as a hard disk or a flash memory, to store an operating system, applications, a user fingerprint image and/or its biometric points, and user pulse information. The processor may execute the operating system and applications which are loaded into the memory unit 120, wherein the memory unit 120 may be a volatile memory such as a dynamic random access memory (DRAM). In an embodiment, the applications stored in the storage unit 130 can be classified into two primary categories such as non-payment applications and payment applications. The non-payment applications include common applications without requiring fingerprint recognition, and applications requiring fingerprint recognition that are not for payment purpose. The payment applications indicate applications for payment purpose and requiring fingerprint recognition.

The fingerprint recognition apparatus 150 may comprise a fingerprint sensing array 151 which comprises a plurality of fingerprint sensors for capturing a fingerprint image of a user. The fingerprint sensors can be implemented by capacitive sensors, thermal sensors, optical sensors, or ultrasonic sensors, but the invention is not limited thereto. In some embodiments, the fingerprint recognition apparatus 150 and the display unit 140 can be integrated into a touch screen, and the fingerprint sensors of the fingerprint sensing array 151 may switch between a touch detection mode and a fingerprint detection mode. In some other embodiments, the fingerprint recognition apparatus 150 is not integrated with the display unit 140. Instead, the fingerprint recognition apparatus 150 is deployed at a specific location of the wearable device 100, such as a physical button or the side surface of the wearable device 100. When the user is wearing the wearable device 100, the pulse sensor 160 which closely contacts the skin or cloth of the user can be used to detect and/or record the pulse of the user.

In some embodiments, the wearable device 100 may be, for example, a smart watch, a smart wristband, or a smart bracelet. In addition to the components shown in FIG. 1, the wearable device 100 may further comprise a watchstrap, a wristband, or a bracelet which is further utilized by the user to wear the wearable device 100 on his wrist, but the invention is not limited thereto. In some embodiment, the wearable device 100 may further comprise other accessories being utilized to attach the wearable device 100 onto the clothing or body of the user. For brief description, the wearable device 100 is a smart watch for example in the following embodiments.

In an embodiment, when the user is wearing the wearable device 100, the user's identity is verified by the wearable device 100 using fingerprint recognition and pulse recognition. When the user's identity is approved, the wearable device 100 is unlocked and ready for operation by the user. For example, when the user is wearing the wearable device 100, the processor 110 may compare the pulse information detected by the pulse sensor 160 with the user pulse information pre-stored in the storage unit 130. When the detected pulse information matches the pre-stored user pulse information, the processor 110 determines that the pulse recognition is approved. When the detected pulse information does not match the user pulse information, the processor 110 determines that the pulse recognition is not approved. In addition, the processor 110 further utilizes the pulse information currently detected by the pulse sensor 160 to determine whether the user is still wearing the wearable device 100. That is, when the pulse sensor 160 detects the pulse of the user, it indicates that the user is wearing the wearable device 100.

Specifically, while the processor 110 determines whether the pulse information matches, the processor 110 may further prompt the user to put his finger on the finger recognition apparatus 150 to perform fingerprint recognition. For example, when the user puts his finger on the fingerprint recognition apparatus 150, the fingerprint recognition apparatus 150 detects and captures a fingerprint image of the user's fingertip. The processor 110 calculates the biometric points of the fingerprint image and compares the calculated biometric points with the biometric points of the user's fingerprint image that has been pre-stored in the storage unit 130. When the calculated biometric points match the pre-stored biometric points, the processor 110 determines that the fingerprint recognition is approved.

In the aforementioned embodiment, the processor 110 further defines different security levels of operation for the wearable device 100, such as working states with different security levels. For example, the working states of the wearable device 100 can be categorized into a first working state and a second working state. The first working state is a working state with a lower security level. After the user wears the wearable device 100 and has been verified by fingerprint recognition and pulse recognition, the wearable device 100 will enter the first working state from the locked state. When the wearable device 100 is in the first working state, the user may freely execute non-payment applications or perform operations requiring lower security level, such as remotely activating appliances or lights at the user's home by the wearable device, but the invention is not limited thereto. The second working state is a working state having a higher security level that is for performing specific operations requiring a higher security level. When the wearable device 100 is in the second working state, a second time of fingerprint recognition is required to confirm the user's identity again. For example, when the wearable device 100 is in the second working state, the user may utilize the wearable device 100 to execute payment applications for payment, remotely unlock the door lock or a safe deposit at the user's home, or remotely unlock vehicles, but the invention is not limited thereto. It should be noted that when the user is not wearing or takes off the wearable device 100, the processor 110 may determine that the user is not wearing the wearable device 100 according to the pulse information from the pulse sensor 160, and control the wearable device 100 to enter a locked state.

In an embodiment, when the user is wearing the wearable device 100 and the processor 110 has determined that the user has been verified through fingerprint recognition and pulse recognition, the processor 110 will unlock the wearable device 100 to enter the first working state with a lower security level for the user to perform operations requiring a lower security level or execute non-payment applications. Each time when the user wants to perform a specific operation requiring a higher security level, such as a payment transaction, the processor 110 may ask the user to perform the second time of fingerprint recognition. After the second time of fingerprint recognition has been approved, the processor 110 control the wearable device 100 to enter the second working state with a higher security level to complete the specific operation. It should be noted that the processor 110 will then control the wearable device 100 to enter the first working state from the second working state after the specific operation is completed.

Figure 2:
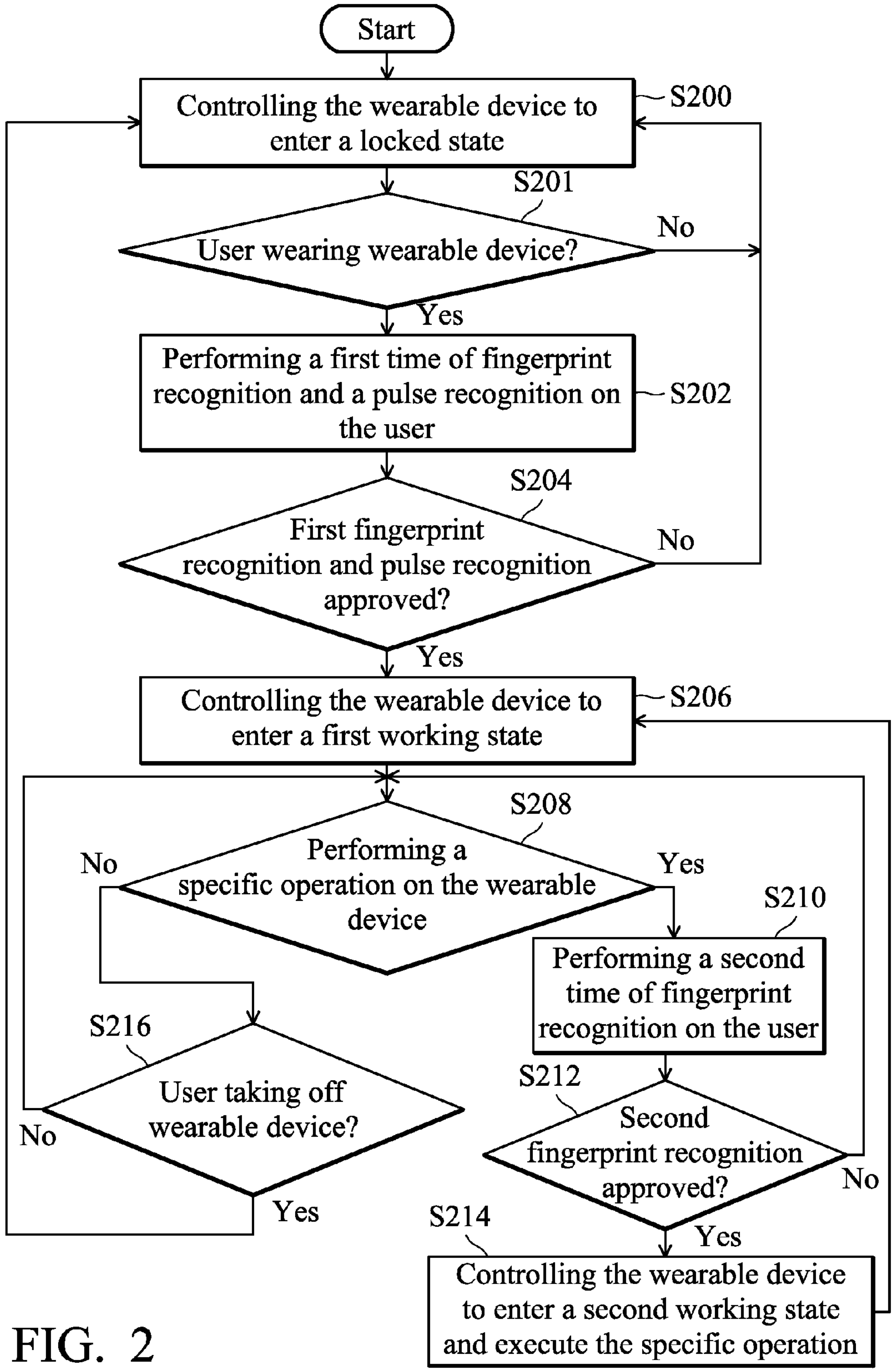
FIG. 2 is a flow chart of a control method for a wearable device in accordance with an embodiment of the invention.

FIG. 2 is a flow chart of a control method for a wearable device in accordance with an embodiment of the invention. Referring to both FIG. 1 and FIG. 2, in step S200, the wearable device 100 is in a locked state. In step S201, it is determined whether the user is wearing the wearable device 100 according to the pulse information detected by the pulse sensor 160. If so, step S202 is performed. Otherwise, step S200 is performed. In step S202, when it is determined that the user is wearing the wearable device 100, a first time of fingerprint recognition and a pulse recognition are performed on the user. In step S204, it is determined whether the first time of fingerprint recognition and the pulse recognition are approved. If so, the wearable device 100 is controlled to enter a first working state (step S206). Otherwise, step S200 is performed. In step S208, it is determined whether the user performs a specific operation requiring a second time of fingerprint recognition (e.g. executing a payment application for payment, or performing an unlocking operation by the wearable device 100). If so, the second time of fingerprint recognition is performed on the user (step S210). Otherwise, step S216 is performed. In step S212, it is determined whether the second time of fingerprint recognition is approved. If so, the wearable device 100 is controlled to enter the second working state to execute the specific operation (step S214). Otherwise, step S208 is performed. In step S216, it is determined whether the user takes off the wearable device 100 (e.g. according to the pulse information detected by the pulse sensor 160). If so, step S200 is performed. Otherwise, step S208 is performed.

In view of the above, a wearable device and an associated control method, which are capable of recognizing the user's identity by both the fingerprint recognition and pulse recognition, are provided in the invention, thereby increasing the security during the use of the wearable device. In addition, when the user wants to perform a specific operation requiring a higher security level (e.g. a payment transaction or performing an unlocking operation), fingerprint recognition is performed again to confirm the user's identity, thereby preventing misuse of the wearable device.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine, such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wearable device, comprising:

a fingerprint recognition apparatus;

a pulse sensor, for detecting pulse information of a user; and a processor, for determining whether the user is wearing the wearable device according to the pulse information detected by the pulse sensor, wherein when the processor determines that the user is wearing the wearable device, the processor performs a first time of fingerprint recognition and a pulse recognition on the user according to a fingerprint image detected by the fingerprint recognition apparatus and the pulse information detected by the pulse sensor, respectively, wherein when the processor determines that the first time of fingerprint recognition and the pulse recognition are approved, the processor controls the wearable device to enter a first working state from a locked state, wherein when the wearable device is in the first working state, the processor further determines whether the user performs a specific operation requiring a second time of fingerprint recognition, wherein when the processor determines that the second time of fingerprint recognition is approved, the processor controls the wearable device to enter a second working state to perform the specific operation, wherein when the wearable device has completed the specific operation in the second working state, the processor controls the wearable device to enter the first working state.

2. The wearable device as claimed in claim 1, wherein the processor further determines whether the user takes off the wearable device according to the pulse information, and when the processor determines that the user has taken off the wearable device, the processor controls the wearable device to enter the locked state.

3. The wearable device as claimed in claim 1, wherein the specific operation is executing a payment application for payment by the wearable device.

4. The wearable device as claimed in claim 1, wherein the specific operation is an unlock operation performed by the wearable device.

5. The wearable device as claimed in claim 1, wherein the processor compares the detected pulse information with pre-stored user pulse information to verify the user's identity when performing the pulse recognition.

6. A control method for a wearable device, wherein the wearable device comprises a fingerprint recognition apparatus and a pulse sensor, the method comprising:

determining whether the user is wearing the wearable device according to the pulse information detected by the pulse sensor;

when it is determined that the user is wearing the wearable device, performing a first time of fingerprint recognition and a pulse recognition to the user according to a fingerprint image detected by the fingerprint recognition apparatus and the pulse information detected by the pulse sensor, respectively;

when it is determined that the first time of fingerprint recognition and the pulse recognition are approved, controlling the wearable device to enter a first working state from a locked state;

when the wearable device is in the first working state, determining whether the user performs a specific operation requiring a second time of fingerprint recognition;

when it is determined that the second time of fingerprint recognition is approved, controlling the wearable device to enter a second working state to perform the specific operation; and when the wearable device has completed the specific operation in the second working state, controlling the wearable device to enter the first working state.

7. The control method as claimed in claim 6, further comprising:

determining whether the user takes off the wearable device according to the pulse information; and when it is determined that the user has taken off the wearable device, controlling the wearable to enter the locked state.

8. The control method as claimed in claim 6, wherein the specific operation is executing a payment application for payment by the wearable device.

9. The control method as claimed in claim 6, wherein the specific operation is performing a unlock operation by the wearable device.

10. The control method as claimed in claim 6, further comprising:

comparing the detected pulse information with the pre-stored user pulse information to verify the user's identity.

* * * * *